United States Patent [19]
Kalen

[11] 3,951,629
[45] Apr. 20, 1976

[54] HIGH TEMPERATURE SUPPORT FOR CYCLONE SEPARATORS

[75] Inventor: Bodo Kalen, Dix Hills, N.Y.

[73] Assignee: Emtrol Corporation, Great Neck, N.Y.

[22] Filed: May 3, 1974

[21] Appl. No.: 466,610

Related U.S. Application Data

[63] Continuation-in-part of Ser. No. 407,180, Oct. 17, 1973, abandoned.

[52] U.S. Cl............................... 55/349; 23/288 S; 55/459 R; 248/17
[51] Int. Cl.$^2$......................................... B01D 45/12
[58] Field of Search............................ 55/349, 459; 248/DIG. 1, 17; 23/288 S; 52/36, 573

[56] References Cited
UNITED STATES PATENTS

| | | | |
|---|---|---|---|
| 3,333,402 | 8/1967 | Kalen................................... | 55/349 |
| 3,460,785 | 8/1969 | Abidi............................. | 248/DIG. 1 |
| 3,971,499 | 11/1973 | Marroni, Jr. et al........... | 248/DIG. 1 |

*Primary Examiner*—Bernard Nozick
*Attorney, Agent, or Firm*—Glenn K. Robbins

[57] ABSTRACT

A device for supporting an apparatus subject to high temperature differentials causing vertical as well as horizontal expansions.

The device comprises a support for supporting one side of the apparatus for relative movement while the opposite side of the apparatus is connected to a fixed support. The side providing for relative movement comprises a support having a support means to provide for vertical and horizontal expansion to maintain the apparatus in horizontal alignment. The support means provides for expansion movement at an angle substantially equal to an angle whose tangent can be determined by the vertical and horizontal expansion forces acting on the apparatus and its supporting structure. The device is suited for cyclone separators supported within high temperature process vessels where one side of the support for the cyclone separator is fixed to the cyclone and the other side is fixed to a beam. In one embodiment the beam has an angular surface supported on an angular rest means such that high temperature differentials both in the vertical and horizontal direction cause sliding movement of the beam in the angular rest means to maintain the cyclone separator in horizontal alignment while permitting its horizontal expansion. In another embodiment the free end of the beam is pivotally connected to one end of a link by a pin connection, the link being further pivotally connected at the opposite end by another pin connection to the high temperature vessel and being so designed that high temperature defferentials in both the horizontal and vertical direction cause angular and pivotal movement of the link to maintain the beam in horizontal alignment.

17 Claims, 16 Drawing Figures

HIGH TEMPERATURE SUPPORT FOR CYCLONE SEPARATORS

RELATED APPLICATION

This application is a continuation-in-part of my co-pending application Ser. No. 407,180 filed Oct. 17, 1973 now abandoned for HIGH TEMPERATURE SUPPORT FOR CYCLONE SEPARATORS, now abandoned.

BACKGROUND OF THE INVENTION

This invention relates to supports for structures subject to high temperature differentials causing both vertical and horizontal expansion. In particular the invention relates to equipment for use in fluidized procesess and more specifically to fluidize bed process vessels which have equipment that must be supported therein, for example cyclone separators.

The present invention is adaptable for use in many fluidized bed process vessels which operate at elevated temperatures. By way of example and embodiment of the present invention will be illustrated in conjunction with a fluid catalytic cracking unit regenerator. However, the invention has equal or greater merit with other vessels or cyclones operating external to any vessel at high temperature. In the process of fluid catalytic cracking of heavy hydrocarbons to lighter products operating temperatures of up to 1450° F. are encountered in the regenerator. These high operating temperatures over extended periods, present difficult problems in suspending or supporting the cyclone equipment within the vessel wherein components are made from different materials, having different temperatures and thermal expansion rates. The problem is compounded by the trend toward higher operating temperatures and larger vessels thereby requiring larger cyclone systems.

For the system to withstand the forces due to its own weight and any pressure differential created by operation of the cyclone system the components become quite thick. Also normal operation of a regenerator allows localized high temperatures to occur which cannot be compensated for within the design of any prior hanger system.

SUMMARY OF THE INVENTION

By means of the present invention the support problems occasioned by high temperature differentials causing both vertical and horizontal expansion have been simplified by providing a simple, practical, reliable maintenance free and inexpensive support arrangement. The present invention allows the major horizontal and vertical components to be relieved of the forces normally encountered which can cause buckling and failure of the support structure. Where used for a support of the cyclone separator the cyclone outlet tubes stiffen the plenum floor resulting in a thinner floor this allowing differential local expansion rates to be accommodated without failure.

In this invention the vertical and horizontal expansion forces are accommodated to maintain the support apparatus horizontal. Thus a rest means as in the form of a horizontal beam can be used to support cyclone separators such that they can be kept level or in horizontal alignment. One end of the beam can be connected to an internal support structure of a high temperature vessel while the other end which is termed the free end can be supported for expansion movement by rest means permitting angular movement. The horizontal and vertical expansion forces acting on the system and the rest means are balanced by providing for expansion movement of the supported free end of the beam through an angle which balances the horizontal and vertical expansion forces.

By means of this invention the support of a cyclone system or other system subject to high temperature differentials causing horizontal and vertical expansion is effected by means of a beam arrangement having a particularly designed angular sliding arrangement to maintain the beam in horizontal alignment. The beam is supported at each of its ends with one end fixed to the apparatus structure for example in the use of the cyclone separator a vertical skirt or a plenum chamber, and the other end is supported to be free to move when the beam increases or decreases in lenght due to thermal expansion. The end of the beam is free to move is supported from a structure or bracket to provide the angular rest means such that the beam and angular rest means form an angle. By proper selection of this angle the thermal expansion will be such that the position of the beam relative to the elevation of the support bracket will be constant over the entire range of operating temperature. This angle may approximate an angle which has a tangent equal to the vertical expansion divided by the horizontal expansion of the apparatus and its supporting structure. This quality facilitates the use of the beam in support of the cyclone or other equipment within the vessel or in other environments subject to horizontal and vertical expansion by accommodating the thermal expansion of the components that occur without resulting in excessive stresses in any component.

In a modification of this invention the rest or support for the free end of the beam uses an angularly moveable link connecting means instead of the sliding angular rest. The angularly moveable link is pivotally connected to the beam at its free end by a pin while the other end of the link is pinned to the high temperature vessel to support the beam therefrom. High temperature vertical and expansion forces cause a pivotal movement of the link through an angle. This angle can be calculated from the predicted vertical and horizontal expansion of the beam, link and supporting structure and the link configuration can accordingly be designed to maintain the beam horizontal under the designed temperature changes in the vessel.

Aside from the problem associated with expansion rates and the high stresses involved, the hanger and support system for the cyclone system or other high temperature apparatus should always support the system or apparatus through the complete operating temperature cycle and should not incur any substantial amount of horizontal force component due to thermal expansion and should take in consideration that the end of the hanger system, coupled to the vessel is at a lower temperature than at the end at hanger system coupled to the cyclone system.

The above feature are objects of this invention and further objects will appear in the detailed description which follows and will be otherwise apparent to those skilled in the art.

For the purpose of illustration of this invention there is shown in the accompanying drawings preferred embodiments thereof. It is to be understood that these drawings are for the purpose of illustration only and

3 that the invention is not limited thereto.

IN THE DRAWINGS

DESCRIPTION OF THE INVENTION

Figure 1:
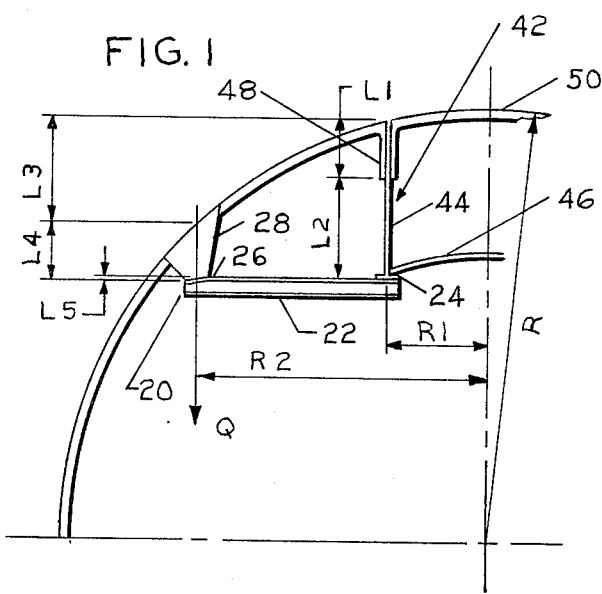
FIG. 1, is a schematic view in elevation showing the support beam and dimensioning employed in calculating the angular relationship used in this invention.
Figure 3:
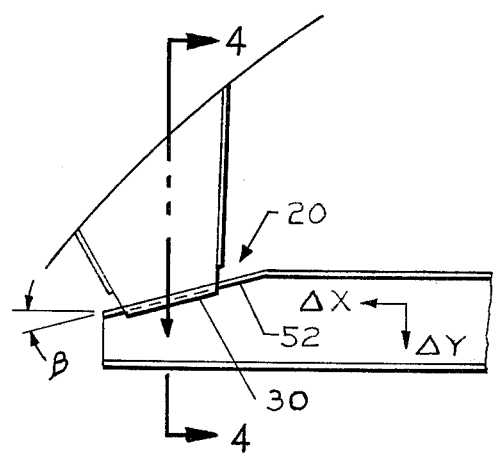
FIG. 3, is a fragmentary view in vertical cross section illustrating the angular relationship between the support bracket and support beam.
Figure 8:
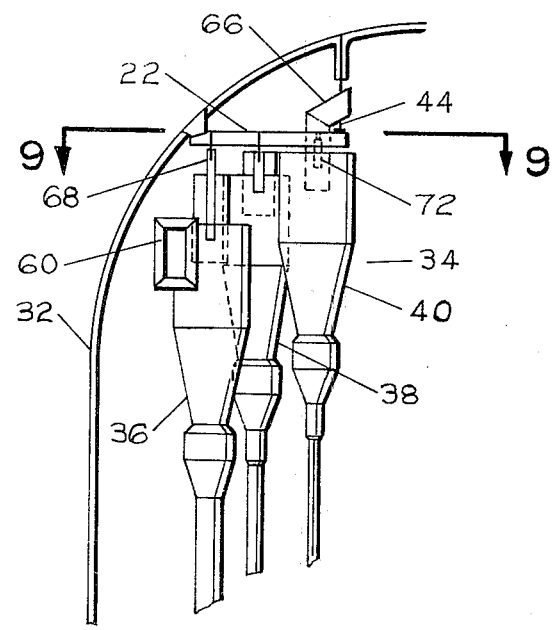
FIG. 8, is a view in vertical section of a catalyst regenerator vessel employed with the beam structure of this invention.

The high temperature angular supporting device of this invention is generally identified by reference numeral 20 as best shown in FIGS. 1, 3 and 8 it is comprised of a beam 22 having a fixed end 24 and a floating or moveable end 26 supported from bracket 28 having a correspondingly angled support rest 30. The support structure is shown in use as in FIG. 8 in a fluid catalytic cracking unit regenerator 32 to support a three stage system of cyclone separators 34 having first stage cyclones 36, second stage cyclones 38 and third stage cyclones 40.

By reference to FIGS. 1 and 8 it will be seen that the three stage cyclone separator systems 34 is suspended from the support beam 22. The support beam 22 is fixed to a plenum chamber 42 at its fixed end at the juncture of the vertical wall 44 and a horizontal floor 46 of the chamber. The vertical wall 44 is insulated at 48 for a distance L1 to reduce the thermal stresses at the roof 50 of the regenerator.

The floating or moveable end 26 of the beam has an angular surface 52 as best shown in FIGS. 3 and 8 which is specially designed as will be more fully pointed out herein below to accommodate both vertical and horizontal expansion to maintain the beam in horizontal alignment as it expands horizontally. The angled surface 52 rests upon the angular track-like support rest 30 depending from the support bracket 28. This relationship is provided by constructing the support beam 22 as in a fashion of an I-beam with the support surface 30 of the bracket having a groove 53 through which the web of the I-beam fits.

Figure 5:
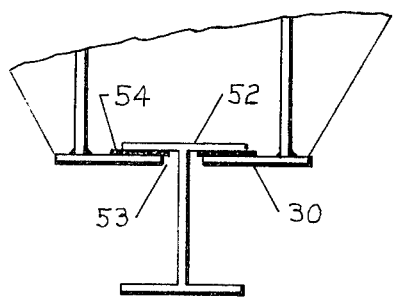
FIG. 5, is a view in vertical section taken similarly to FIG. 4 but showing the use of a slide plate for facilitating slide movement.

In the modification of FIG. 5 a Lubrite or graphite plate 54 may be interfitted between the angled surface or head 52 of the support beam and the supporting track-like surface 30 of the support bracket to provide for ease in sliding movement and reduction of friction.

Figure 6:
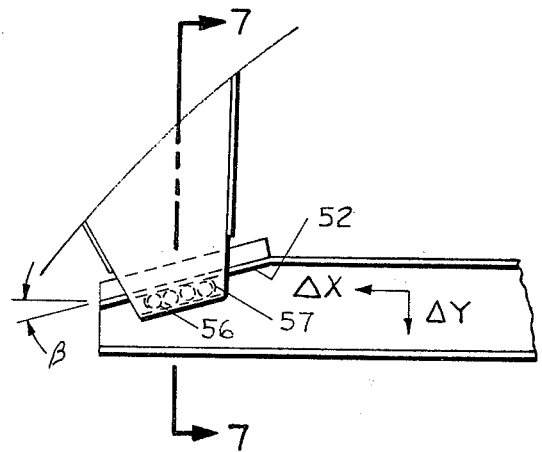
FIG. 6, is a view taken similarly to FIG. 3 but showing a roller bearing modification.
Figure 7:
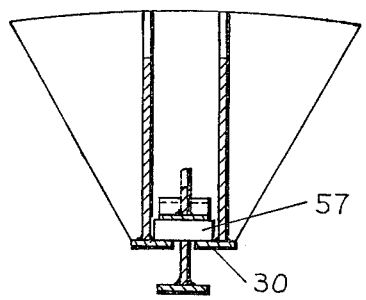
FIG. 7, is a view in cross section taken on the line 7—7 in FIG. 6.

In FIG. 6 and 7 a modification employing roller bearings 56 or ball bearings is shown. The bearings are positioned between the beam head 52 and the support bracket track 30 and are confined at the ends by stop members 57. The bracket and beam structure at the top, bottom and sides and the stop members at the ends form a cage confining the bearings while permitting substantially friction free relative movement of the beam on the support track 30.

Figure 9:
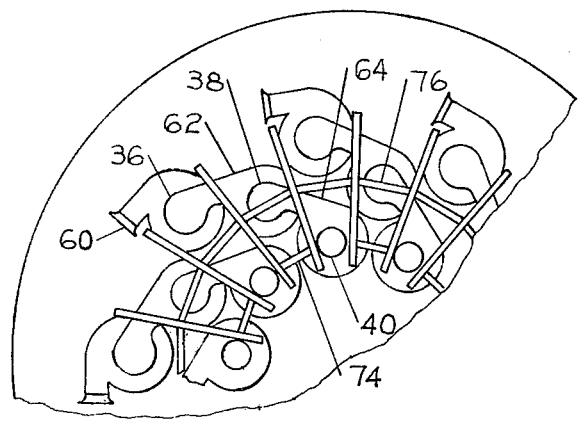
FIG. 9, is a fragmentary top plan view of the beam supporting a triple stage cyclone separator system.

The three stage cyclone separator system 34 is best shown in FIGS. 8 and 9. The first stage cyclone separator 36 has an inlet 60 and an outlet 62 feeding into second stage cyclone separator 38. In the same fashion the cyclone separator 38 has an outlet 64 feeding into the third stage cyclone separator 40. The cyclone separator 40 has an outlet 66 connected to vertical wall 44 of the plenum chamber 42 as shown in FIG. 8.

The three stage cyclone separator system is connected to the support beam 22 by vertical support bars 68 connecting the first stage separators, support bars 70 connecting the second cyclone separators 38, and hanger supports 72 connecting the third stage sysclone separators 40. Horizontal spacer bars 74 connect the horizontal beams at the central region and horizontal spacer bars 76 connect the intermediate positions of the horizontal beams all as shown in FIG. 9.

Figure 10:
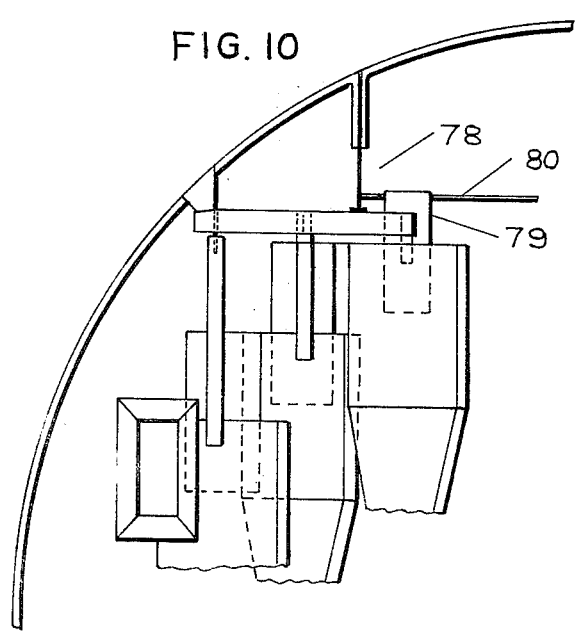
FIG. 10, is a view in vertical section of a catalyst regenerator vessel showing a modification of the fixed beam support and the plenum floor.

A modification 78 of the support of the three stage cyclone separator system is shown in FIG. 10. Here the beam and hanger support is generally the same for the first, second and third stage cyclone separators but the outlet 79 of the third stage cyclone separator instead of being connected to the vertical and horizontal wall juncture of the plenum chamber is connected to a horizontal wall 80 of the chamber. By this construction the cyclone outlet tubes stiffen the flat plenum chamber floor resulting in a thinner floor thus allowing differential local expansion rates to be accommodated without possible failure.

Figure 11:
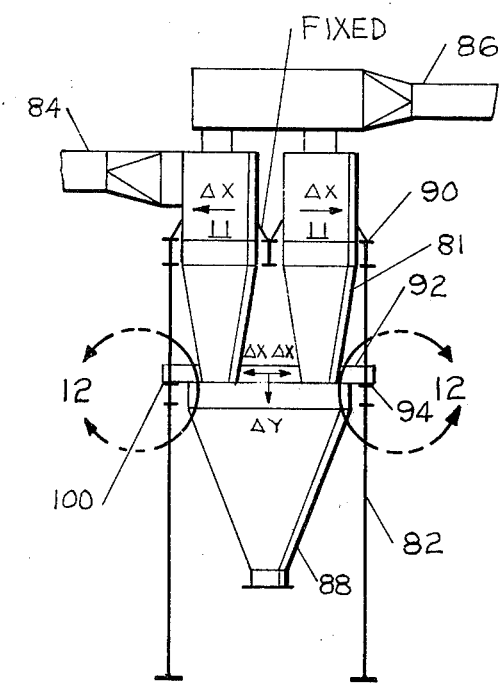
FIG. 11, is a view in elevation showing the use of the angular beam arrangement for a cold steel support.
Figure 12:
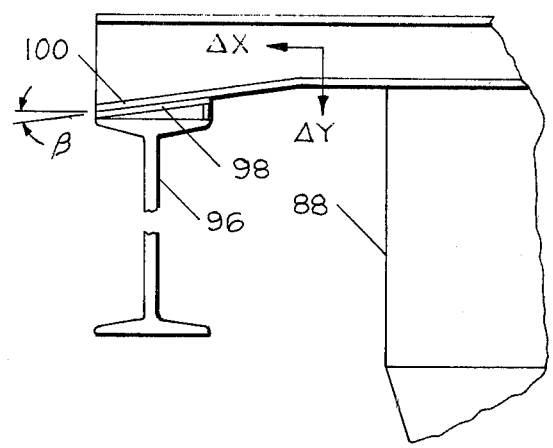
FIG. 12, is an enlarged view in elevation showing the structure of the floating support beam on the angular cold steel support.

The high temperature angular support device for this invention can be employed in various environments where there are horizontal and vertical expansion forces due to high temperature. A further modification of this invention for use in supporting cyclone separators is shown in FIG. 11 where a cold steel support is employed and the cyclone separators are not utilized inside a high temperature fluid vessel. In FIG. 11 the cyclone separators are generally indicated by reference numeral 81 and are supported on a cold steel support frame 82. A hot gas inlet 84 provides for entry of hot gases into the cyclones and a hot gas outlet 86 provides for the exit. A hopper 88 is supported at the bottom of the cyclones. The cyclones are supported at their upper portion by a vertical fixed support 90 while at their bottom the support is provided through a floating support beam 92. The support beam 92 as shown more particularly in FIG. 12 is fixed in the middle to the hopper 88. The cold steel support 96 is in the nature of an I-beam having an angled surface 98 at the top which supports in sliding relation an angled surface 100 at the floating ends of the beam. The angular relationship provides for both vertical and horizontal expansion forces to be accommodated to maintain the beam level.

Figure 13:
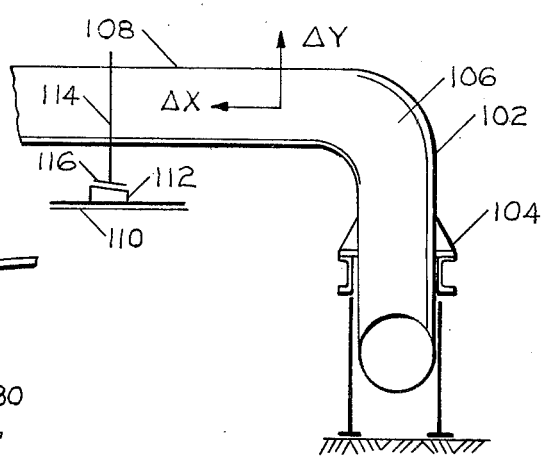
FIG. 13, is a view in elevation showing the use of the angular floating support beam for supporting a hot fluid pipe line subjected to vertical and horizontal expansion upon a cold support.

The high temperature device is shown used to support a hot fluid line in FIG. 13. As shown in FIG. 13 a hot fluid line 102 which for example, may be a flue gas line is fixed at a bottom support 104. The flue gas pipe line has an elbow 106 and a horizontal length 108 subject to both vertical and horizontal expansion because of the elbow turn. A conventional cold steel support 110 is employed with a specially designed angular cold steel support surface 112 resting on top on the cold steel support. A saddle support 114 is connected to the pipe portion 108. The saddle support 114 has a mating angled member 116 which rests in sliding relation on top of the angled support rest 112. The horizontal and vertical expansion forces tend to maintain the saddle support level and the supported pipe line section 108 horizontal through high temperature fluctuations while permitting horizontal movement.

Figure 14:
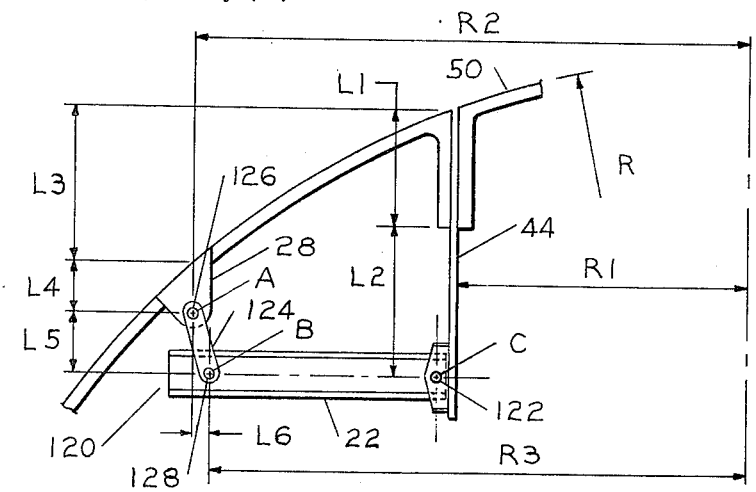
FIG. 14, is a schematic view in elevation taken similarly to FIG. 1, showing a modification of the invention.
Figure 15:
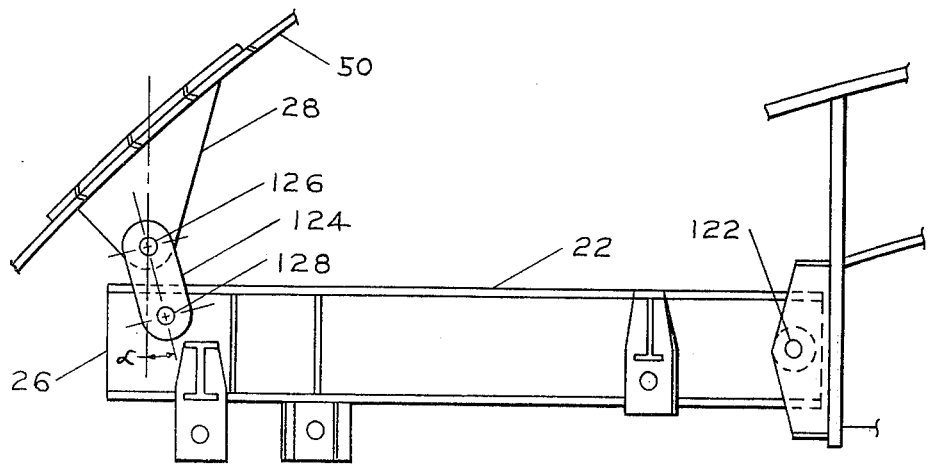
FIG. 15, is an enlarged fragmentary view in vertical cross section of the modification of FIG. 14.

Another modification of this invention illustrating the employment of a pivotal link connection for the free end of the support beam is shown in FIGS. 14 and 15 and is generally identified by the reference numeral 20. In this modification the vessel in which the beam is employed is generally similar to the structure shown in FIGS. 1 through 10 and for common elements of this structure the same reference numerals are employed. It will be noted that the beam 22 is connected to the plenum wall 44 by a pinned connection C or 122. Instead of the pinned connection it will be understood a fixed connection can be employed. The free end of the beam is connected by a link 124 for pivotal movement through a pin at point A and reference numeral 126 supported by the vessel bracket 28. A lower end B of the link also identified by the reference numeral 128 has a similar pin connection to the free end of the beam. The angular relationship alpha shown in FIG. 15 between the pivot points A and B in the link and the vertical is specially chosen in order that the expansion forces in both the vertical and horizontal components are compensated or balanced in order to maintain the beam in horizontal alignment.

Figure 16:
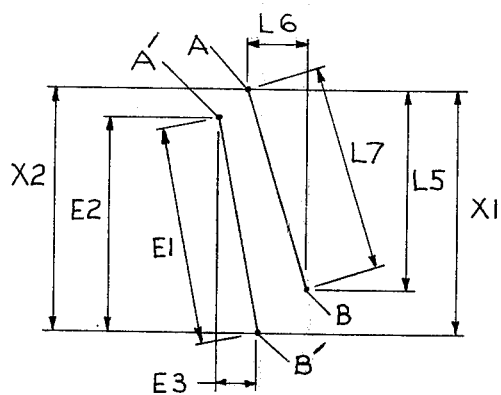
FIG. 16, is a schematic view illustrating the manner of calculating the angular relationship of the modification.

FIG. 16 is a schematic diagram showing the various dimensions employed in the linkage and the expansion dimensions for the vertical and horizontal movements due to high temperatures in the vessel acting upon the system. They are further identified in the design example which follows.

In the design of the link system the angle alpha that the link makes with the vertical is chosen by trial and error. In the following example this angle is an angle whose tangent is L 6 divided by L 5 equals 0.333 which represents an angle of about 18 and ½°.

For the purpose of understanding the horizontal and vertical expansion forces considered in determining the angular relationship for the high temperature support of this invention there is set forth below an example based on the configuration of FIG. 1.

EXAMPLE 1

DIMENSIONS FOR THE SYMBOLS USED $R = 22'-7'' = 271''$
$R1 = 6'-0'' = 72''$
$R2 = 15'-5 ¼ = 185.25''$
$L1 = 3'-0'' = 36'$
$L2 = 33'-6'' = 42''$
$L3 = 5'-3 \ 7/16 = 63.4375''$
$L4 = 1'-4 \ 13/16 = 16.8125''$
$L5 = 2 1/4 = 2.25''$

EXPANSION RATES:

Stainless steel type 304 at 1400°F = $A_1$ = 0.01408 in. per in.
Stainless steel type 304 at 1000°F = $A_2$ = 0.00958 in. per in.
Carbon steel at 400°F = $A_3$ = 0.00225 in. per in.

EXPANSION CALCULATION:

Vertical expansion in plenum and beam at fixed support = $Y'$

At 1,000°F plenum = $L1 \times A_2$ = 36 × 0.00958 = 0.34488 in.
At 1,400°F plenum = $L2 \times A_1$ = 42 × 0.01408 = 0.59136 in.
At 1,400°F beam = $L5 \times A_1$ = 2.25 × 0.01408 = 0.03168 in.
Total vertical expansion at fixed support = $Y'$ = 0.96792 in.

Horizontal expansion in plenum and beam from fixed support = $X'$

At 1,400°F beam + plenum = $R2 \times A_1$ = 185.25 ×0.01408 in.
Total horizontal expansion at fixed support = $X'$ = 2.60832 in.

Vertical expansion of vessel and bracket at support = $Y''$

At 400°F vessel = $L3 \times A_3$ = 63.4375 × 0.00225 = 0.14273 in.
At 1,400°F bracket = $L4 \times A_1$ = 16.8125 × 0.01408 = 0.23672 in.
Total vertical expansion at support = $Y''$ = .37945 in.

Horizontal expansion of vessel at support = $X''$

At 400°F vessel = $R2 \times A_3$ = 185.25 × 0.00225 = 0.41681 in.
Total horizontal expansion at support = $X''$ = .41681 in.

Calculation of horizontal and vertical expansion acting on support

Unbalanced vertical expansion = $Y'-Y''$ = 0.96792 - 0.41681 = 0.58847 in.
Unbalanced horizontal expansion = $X'-X''$ = 2.60832 - 0.41681 = 2.19151 in.

Figure 2:
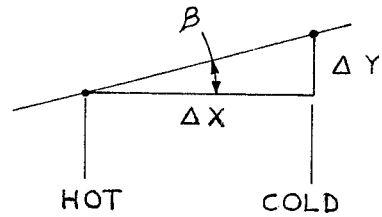
FIG. 2, is a schematic view illustrating the manner of calculating the angular relationship for the beam through the vertical and horizontal expansion.
Figure 4:
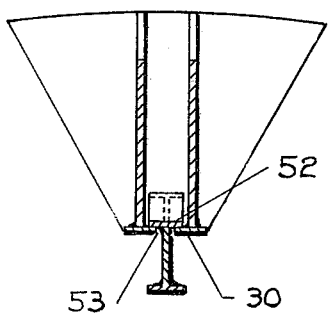
FIG. 4, is a view in section taken on the line 4—4 of FIG. 3.

Now, referring to FIG. 2, the angle B for the support beam and the support bracket angular relationship is simply calculated. Thus this is determined as the angle whose tangent is equal to $Y/X$ = 0.58847/2.19151 = 0.26852 and B = 15°.

For the purpose of understanding the operation of the link modification shown in FIGS. 14 and 15 calculations are shown in the Example 2 shown below:

EXAMPLE 2

DIMENSIONS FOR THE SYMBOLS USED

R = 271"  
R1 = 72"  
R2 = 185.25"  
R3 = 180.25"  
L1 = 36"  
L2 = 57"  
L3 = 63.4375"  
L4 = 16.8125"  
L5 = 15"  
L6 = 5"  
L7 = 15.81139

The expansion rates are the same as in Example 1.

EXPANSION CALCULATION

Vertical expansion in plenum and beam = $Y'$

At 1,000°F plenum = L1 × $A_2$ = 36 × 0.00958 = 0.34488

At 1,400°F plenum = L2 × $A_1$ = 57 × 0.01408 = 0.80256

Vertical expansion at plenum support = $Y'$ = 1.14744

Horizontal expansion in plenum and beam from plenum support = $X'$

At 1400°F beam + plenum = R3 × $A_1$ = 180.25 × 0.01408 in = 2.53792

Vertical Expansion of Vessel and Bracket at Support = $Y''$

At 400°F vessel = L3 × $A_3$ = 63.4375 × 0.00225 = 0.14273

At 1,400°F bracket = L4 × $A_1$ = 16.8125 × 0.01408 = 0.23672   $Y''$ = .37945

Horizontal Expansion of Vessel at Support = $X''$

At 400°F vessel = R2 × $A_3$ = 185.25 × 0.00225 = 0.41681

Expansion of Link and Calculation of Expanded Dimensions

E1 = L7 + L7 × $A_1$ = 15.81139 + 15.81139 × 0.01408 = Expanded length of link = 16.03401

E3 = L6 + $X''$ − $X'$ = 5 + 0.41681 − 2.53792 = Horizontal component = 2.87889

E2 = $(E1^2 - E3^2)$ = $(16.03401^2 - 2.87889^2)$ = Vertical component = 15.77344

High temperature alpha = $\tan^{-1}$ = E3/E2 = 2.87889/15.77344 = .1825 and alpha = 10 ⅓°

Calculation to Check Whether System is in Balance for Beam Horizontal Alignment

X1 = L5 + $Y'$ = 15 + 1.14744 = 16.14744  
X2 = E2 + $Y''$ = 15.77344 + 0.37945 = 16.15289  
Y = X2 − X1 = 0.00545"

System is considered in balance and horizontal alignment if Y equals or is less than 1/32".

It will be understood that in the calculation to check whether the system is in balance for the beam is horizontal alignment that if the difference in elevation of one end over the other end exceeds one-thirty second of an inch the angle alpha can be increased or decreased to bring the expanded system in balance for horizontal alignment and thus by trial and error the balancing can be readily determined.

Various changes and modifications of this invention may be made as will be readily apparent to those skilled in the art. Such changes and modifications are within the scope and teaching of this invention as defined by the claims depended thereto.

What is claimed is:

1. A device for supporting a horizontally aligned apparatus from a structure subject to high temperature differences, said device comprising a first support supporting one side of the apparatus for relative movement therewith and a second support supporting an opposite side of the apparatus, from a support connection restraining said opposite side from vertical and horizontal expansion with respect to said second support said first named support comprising a support means to provide for vertical and horizontal expansion to maintain the apparatus in horizontal alignment comprising an angular rest means and support for relative horizontal and vertical sliding movement against a corresponding angular surface of the apparatus.

2. The device of claim 1 in which the angular rest means is at an angle to the horizontal substantially equal to an angle whose tangent is equal to the vertical expansion divided by the horizontal expansion of the apparatus and its supporting structure.

3. The device of claim 1, in which a link means is pivotally connected at an upper end to said structure and pivotally connected at a lower end to the apparatus to be maintained in horizontal alignment.

4. The device of claim 3, in which the link means is moveable through an angle determined by the vertical and horizontal expansion forces acting upon it.

5. A device for supporting a cyclone separator within a vessel subjected to high temperature differences, said device comprising a beam supporting the cyclone separator, said beam being connected at one end to an interior vessel member through a support connection restraining said beam end from vertical and horizontal expansion relative to said interior vessel member and at the other supported by support means to provide for vertical and horizontal expansion of the other end of the beam relative to the support means to maintain the beam in horizontal alignment.

6. The device of claim 4, in which the support means is a rest means and is supported from the top of the vessel and is free to expand and contract vertically.

7. The device of claim 5, in which the support means is an angular rest means and supports a corresponding angular surface of the beam.

8. The device of claim 7, in which the angular rest means is at an angle to the horizontal substantially equal to an angle whose tangent is equal to the vertical expansion divided by the horizontal expansion of the vessel support structure for the beam and the beam itself.

9. The device of claim 7, in which the angular rest means comprises a pair of spaced track members having an opening between said track members and the beam has a vertical web fitting through said opening and connecting with a T-shaped head resting on said track members.

10. The device of claim 9, in which a flat plate means having friction reducing properties is positioned between the track members and the beam head.

11. The device of claim 9, in which roller bearings are positioned between the track members and the beam head to reduce friction.

12. The device of claim 5, in which the vessel is provided with a plenum chamber and outlet tubes of a cyclone separator connected to said plenum chamber.

13. The device of claim 12, in which the outlet tube is connected to the floor of the chamber to provide for stiffening of the floor.

14. The device of claim 5, in which a multi-stage cyclone separator is provided and each of said stages are connected to said beam.

15. The device of claim 14, in which a plurality of multistage separators are provided extending generally radially from the center of the vessel, and said support beam being provided as a plurality of radially extending support beams having hanger means supporting the cyclone separators spaced from the fixed beam support.

16. The device of claim 5, in which the support means comprises a link means pivotally connected at an upper end to said vessel and pivotally connected at a lower end to said beam to maintain the beam in horizontal alignment.

17. The device of claim 16, in which the link means is moveable through an angle determined by the vertical and horizontal expansion forces acting upon it.

* * * * *